(12) United States Patent
Zhang et al.

(10) Patent No.: US 11,523,140 B2
(45) Date of Patent: Dec. 6, 2022

(54) NONLINEAR ADAPTIVE LOOP FILTERING IN VIDEO PROCESSING

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/354,250

(22) Filed: Jun. 22, 2021

(65) Prior Publication Data

US 2021/0321095 A1 Oct. 14, 2021

Related U.S. Application Data

(63) Continuation of application No. PCT/CN2020/080827, filed on Mar. 24, 2020.

(30) Foreign Application Priority Data

Mar. 24, 2019 (WO) ................ PCT/CN2019/079395

(51) Int. Cl.
*H04N 19/117* (2014.01)
*H04N 19/82* (2014.01)
(Continued)

(52) U.S. Cl.
CPC .......... *H04N 19/82* (2014.11); *H04N 19/117* (2014.11); *H04N 19/17* (2014.11); *H04N 19/174* (2014.11); *H04N 19/176* (2014.11); *H04N 19/96* (2014.11)

(58) Field of Classification Search
CPC ....... H04N 19/117; H04N 19/17; H04N 19/82
See application file for complete search history.

(56) References Cited

U.S. PATENT DOCUMENTS 10,057,574 B2  8/2018  Li et al.
10,506,230 B2  12/2019  Zhang et al.
(Continued)

FOREIGN PATENT DOCUMENTS

CN   103370936 A   10/2013
CN   104054338 A    9/2014
(Continued)

OTHER PUBLICATIONS

Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.

(Continued)

*Primary Examiner* — Zaihan Jiang
(74) *Attorney, Agent, or Firm* — Perkins Coie LLP

(57) ABSTRACT

Devices, systems and methods for video processing are described. In an exemplary aspect, a method for video processing includes encoding a video unit of a video as an encoded video unit; generating reconstruction samples from the encoded video unit; performing a clipping operation on the reconstruction samples, wherein a clipping parameter used in the clipping operation is a function of a clipping index and a bit-depth of the reconstruction samples or a bit-depth of samples of the video unit; applying a non-linear adaptive loop filter to an output of the clipping operation; and generating a coded representation of the video using the encoded video unit.

19 Claims, 14 Drawing Sheets

(51) Int. Cl.
    *H04N 19/17*     (2014.01)
    *H04N 19/174*     (2014.01)
    *H04N 19/176*     (2014.01)
    *H04N 19/96*     (2014.01)

(56) References Cited

U.S. PATENT DOCUMENTS

| | | | |
|---|---|---|---|
| 10,721,469 | B2 | 7/2020 | Zhang et al. |
| 10,778,974 | B2 | 9/2020 | Karczewicz et al. |
| 10,855,985 | B2 | 12/2020 | Zhang et al. |
| 2005/0281479 | A1 | 12/2005 | Song |
| 2012/0020413 | A1* | 1/2012 | Chen ............... H04N 19/61 375/240.26 |
| 2013/0107973 | A1 | 5/2013 | Wang et al. |
| 2013/0113884 | A1* | 5/2013 | Leontaris ......... H04N 19/48 348/43 |
| 2013/0188733 | A1 | 7/2013 | Van Der Auwera et al. |
| 2014/0022211 | A1* | 1/2014 | Karpin .............. G06F 3/04182 345/174 |
| 2014/0023136 | A1* | 1/2014 | Park ................. H04N 19/82 375/240.12 |
| 2014/0192892 | A1 | 7/2014 | Van Der Auwera et al. |
| 2014/0286442 | A1 | 9/2014 | Kim et al. |
| 2015/0092847 | A1* | 4/2015 | Su ................... H04N 19/33 375/240.12 |
| 2016/0227193 | A1* | 8/2016 | Osterwood ......... B25J 9/1697 |
| 2016/0227224 | A1 | 8/2016 | Hsieh et al. |
| 2017/0238020 | A1 | 8/2017 | Karczewicz et al. |
| 2018/0041778 | A1 | 2/2018 | Zhang et al. |
| 2018/0041779 | A1 | 2/2018 | Zhang et al. |
| 2018/0091812 | A1* | 3/2018 | Guo ................. H04N 19/15 |
| 2018/0352264 | A1 | 12/2018 | Guo et al. |
| 2019/0238845 | A1 | 8/2019 | Zhang et al. |
| 2019/0306502 | A1* | 10/2019 | Gadde .............. H04N 19/124 |
| 2020/0267381 | A1 | 8/2020 | Vanam et al. |
| 2020/0267392 | A1* | 8/2020 | Lu .................. H04N 19/159 |
| 2020/0413038 | A1 | 12/2020 | Zhang et al. |
| 2021/0314628 | A1 | 10/2021 | Zhang et al. |

FOREIGN PATENT DOCUMENTS

| | | |
|---|---|---|
| CN | 106331709 A | 1/2017 |
| CN | 107257458 A | 10/2017 |
| CN | 108028920 A | 5/2018 |
| CN | 109479130 A | 3/2019 |
| EP | 3297282 * | 9/2015 |
| EP | 3297282 * | 9/2016 |
| EP | 2870758 B1 | 11/2016 |
| GB | 2421593 A | 6/2006 |
| WO | 2011048555 A1 | 4/2011 |
| WO | 2011140960 A1 | 11/2011 |
| WO | 2018135830 A1 | 7/2018 |

OTHER PUBLICATIONS

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.

Chen et al. "Algorithm Description of Joint Exploration Test Model 7 (JEM 7)," Joint Video Exploration Team (JVET) ot ITU-T SG 16 WP 3 and ISO/IEC JTC 1/SC 29/WG 11, 7th Meeting: Torino, IT, Jul. 13-21, 2017, document JVET-G1001, 2017.

Chujoh et al. "CE14 Related: Adaptive Colour Space Clipping Filter," Joint Video Experts Team (JVET) of ITU-T SG 16 WP 3 and iSO/IEC JTC 1/SC 29/WG 11, 12th Meeting, Macao, CN, Oct. 3-12, 2018, document JVET-L0357, 2018.

Hu et al. "Coding Tree Block Based Adaptive Loop Filter," Joint Video Experts Team (JVET) of ITU-T SG 16 WP 3 and ISO/IEC JTC 1/SC 29/WG 11, 13th Meeting, Marrakech, MA, Jan. 9-8, 2019, document JVET-M0429, 2019.

"Information Technology—High Efficiency Coding and Media Delivery in Heterogeneous Environments—Part 2: High Efficiency Video Coding" Apr. 20, 2018, ISO/DIS 23008, 4th Edition.

Karczewicz et al. "Geometry Transformation-based Adaptive In-Loop Filter," Qualcomm Technologies Inc. San Diego, CA, 2016.

Lim et al. "CE2: Subsampled Laplacian Calculation (Test 6.1, 6.2, 6.3, and 6.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0147, 2018.

Lu et al. "CE12: Mapping Functions (Test CE12-1 and CE12-2)," Joint Video Experts Team (JVET) of ITU-t SG 16 WP 3 and ISO/IEC JTC 1/SC 29/WG 11, 13th Meeting, Marrakech, MA, Jan. 9-18, 2019, document JVET-M0427, 2019.

Pu et al. "CE12-4: SDR In-Loop Reshaping," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0246, 2018.

Taquet et al. "Non-Linear Adaptive Loop Filter," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0385, 2019.

Taquet et al. "CE5: Results of Tests CE5-3.1 to CE5-3.4 on Non-Linear Adaptive Filter," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0242, 2019.

International Search Report and Written Opinion from International Patent Application No. PCT/CN2020/080827 dated Jun. 30, 2020 (10 pages).

International Search Report and Written Opinion from International Patent Application No. PCT/CN2020/080829 dated May 15, 2020 (9 pages).

Non Final Office Action from U.S. Appl. No. 17/354,282 dated Oct. 28, 2021.

First Examination Report from Indian Patent Application No. 202147043501 dated Apr. 8, 2022.

Chen et al. "Description of SDR, HDR and 360° Video Coding Technology Proposal by Huawei, GoPro, HiSilicon, and Samsung," Joint Video Exploration Team (JVET) of ITU-T SG 16 WP 3 and ISO/IEC JTC 1/SC 29/WG 11 10th Meeting: San Diego, US, Apr. 10-20, 2018, document JVET-J0025, 2018. (cited in EP20777266.6 EESR dated Jul. 20, 2022).

Ikonin et al. "Non-CE5: Non-Linear ALF Simplifications," Joint Video Experts Team (JVET)of ITU-T SG 16 WP 3 and ISO/IEC JTC 1/SC 29/WG 1115th Meeting: Gothenburg, SE, Jul. 3-12, 2019, document JVET-O0188, 2019. (cited in JP2021-556952 OA1 dated Sep. 13, 2022).

Unno et al. "Non-CE5: A Simplification of Clipping Thresholds for Non-Linear ALF" Joint Video Experts Team (JVET) of ITU-T SG 16 WP 3 and ISO/IEC JTC 1/SC 29/WG 1115th Meeting: Gothenburg, SE, Jul. 3-12, 2019, document JVET-O0386, 2019. (cited in JP2021-556952 OA1 dated Sep. 13, 2022).

Extended European Search Report from European Patent Application No. 20777266.6 dated Jul. 20, 2022 (11 pages).

* cited by examiner

NONLINEAR ADAPTIVE LOOP FILTERING IN VIDEO PROCESSING

CROSS REFERENCE TO RELATED APPLICATIONS

This application is a continuation of International Patent Application No. PCT/CN2020/080827, filed on Mar. 24, 2020 which claims the priority to and benefits of International Patent Application No. PCT/CN2019/079395, filed on Mar. 24, 2019. All the aforementioned patent applications are hereby incorporated by reference in their entireties.

TECHNICAL FIELD

This patent document relates to video processing techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video processing, and for example, to non-linear adaptive loop filtering for video processing are described. The described methods may be applied to both the existing video coding standards (e.g., High Efficiency Video Coding (HEVC)) and future video coding standards (e.g., Versatile Video Coding (VVC)) or codecs.

In one representative aspect, the disclosed technology may be used to provide a method for video processing. This method includes encoding a video unit of a video as an encoded video unit; generating reconstruction samples from the encoded video unit; performing a clipping operation on the reconstruction samples, wherein a clipping parameter used in the clipping operation is a function of a clipping index and a bit-depth of the reconstruction samples or a bit-depth of samples of the video unit; applying a non-linear adaptive loop filter to an output of the clipping operation; and generating a coded representation of the video using the encoded video unit.

In another aspect, the disclosed technology may be used to provide a method for video processing. This method includes parsing a coded representation of a video for an encoded video unit representing a video unit of the video; generating reconstruction samples of the video unit from the encoded video unit; performing a clipping operation on the reconstruction samples, wherein a clipping parameter used in the clipping operation is a function of a clipping index and a bit-depth of the reconstruction samples or a bit-depth of the video unit; and applying a non-linear adaptive loop filter to an output of the clipping operation to generate a final decoded video unit.

In another aspect, the disclosed technology may be used to provide a method for video processing. This method includes performing a conversion between a coded representation of a video comprising one or more video regions and the video; and determining a clipping parameter for filtering a reconstruction of a video unit of a video region using a non-linear adaptive loop filter, and wherein the determining is based on coded information of the video and/or the video region and/or the video unit.

In another aspect, the disclosed technology may be used to provide a method for video processing. This method includes performing a conversion between a coded representation of a video comprising one or more video regions and the video; and determining a clipping parameter for filtering a reconstruction of a video unit of a video region using a non-linear adaptive loop filter, and wherein the clipping parameter is a function of a color representation format.

In another aspect, the disclosed technology may be used to provide a method for video processing. This method includes performing a conversion between a coded representation of a video comprising one or more video regions and the video; and determining a clipping parameter for filtering a reconstruction of a video unit of a video region using a non-linear adaptive loop filter, and wherein the clipping parameter depends on whether an in-loop reshaping (ILR) is applied for reconstructing the video unit based on a representation of the video unit in a first domain and a second domain and/or scaling chroma residue of a chroma video unit.

In another aspect, the disclosed technology may be used to provide a method for video processing. This method includes performing a conversion between a coded representation of a video comprising one or more video regions and the video, wherein the coded representation includes first side information that provides a clipping parameter for filtering a reconstruction of a video unit of a video region using a non-linear adaptive loop filter; wherein the first side information is signaled together with second side information indicative of filter coefficients used in the non-linear adaptive loop filter.

In another aspect, the disclosed technology may be used to provide a method for video processing. This method includes performing a conversion between a coded representation of a video comprising one or more video regions and the video, wherein the coded representation includes side information indicative of multiple sets of clipping parameters for filtering a reconstruction of a video unit of a video region using a non-linear adaptive loop filter.

In another aspect, the disclosed technology may be used to provide a method for video processing. This method includes performing a conversion between a coded representation of a video comprising one or more video regions and the video; wherein the coded representation includes side information that provides one or more clipping parameters for filtering a reconstruction of a chroma video unit of a video region using a non-linear adaptive loop filter, wherein the one or more clipping parameters depend on a color format.

In another aspect, the disclosed technology may be used to provide a method for video processing. This method includes performing a conversion between a coded representation of a video comprising one or more video regions and the video, wherein the coded representation includes side information that provides a clipping parameter for filtering a reconstruction of a video unit of a video region using an adaptive loop filter, wherein the performing includes generating a filtered video unit by applying a clipping operation to sample differences at a video region level.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, one or more of the above-disclosed methods can be an encoder-side implementation or a decoder-side implementation.

The above and other aspects and features of the disclosed technology are described in greater detail in the drawings, the description and the claims.

BRIEF DESCRIPTION OF THE DRAWINGS

Figures 4A, 4B:
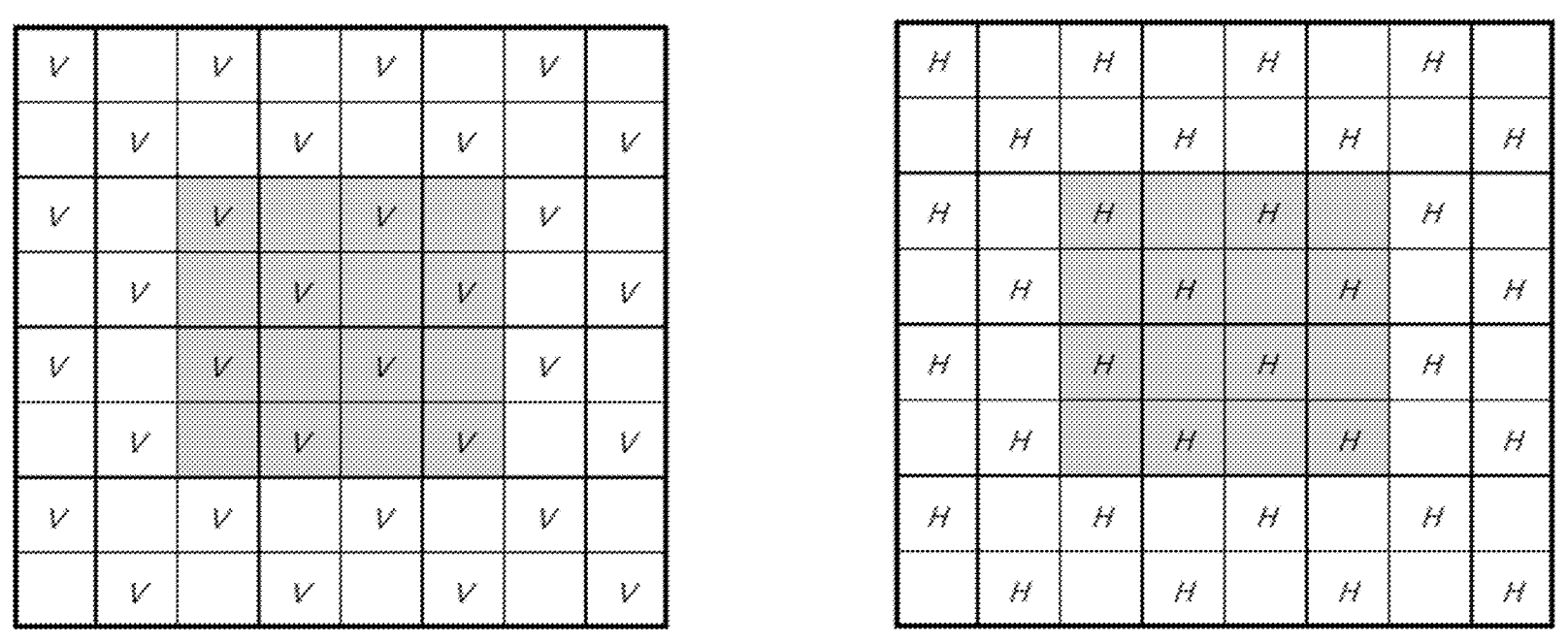
Figures 4C, 4D:
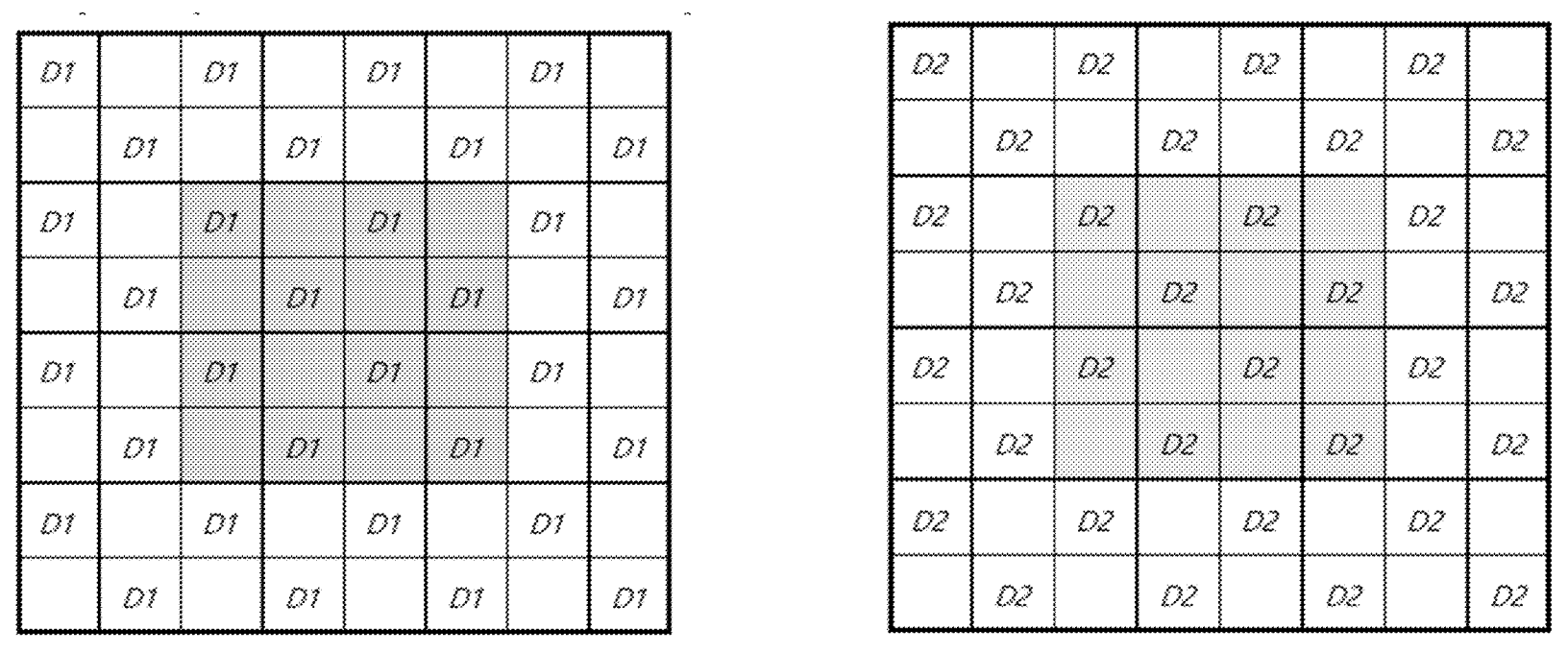

FIGS. 4A to 4D show example subsampled Laplacian calculations for adaptive loop filter (ALF) classification.

FIG. 5 shows an example of a luma filter shape.

DETAILED DESCRIPTION

Figure 1:
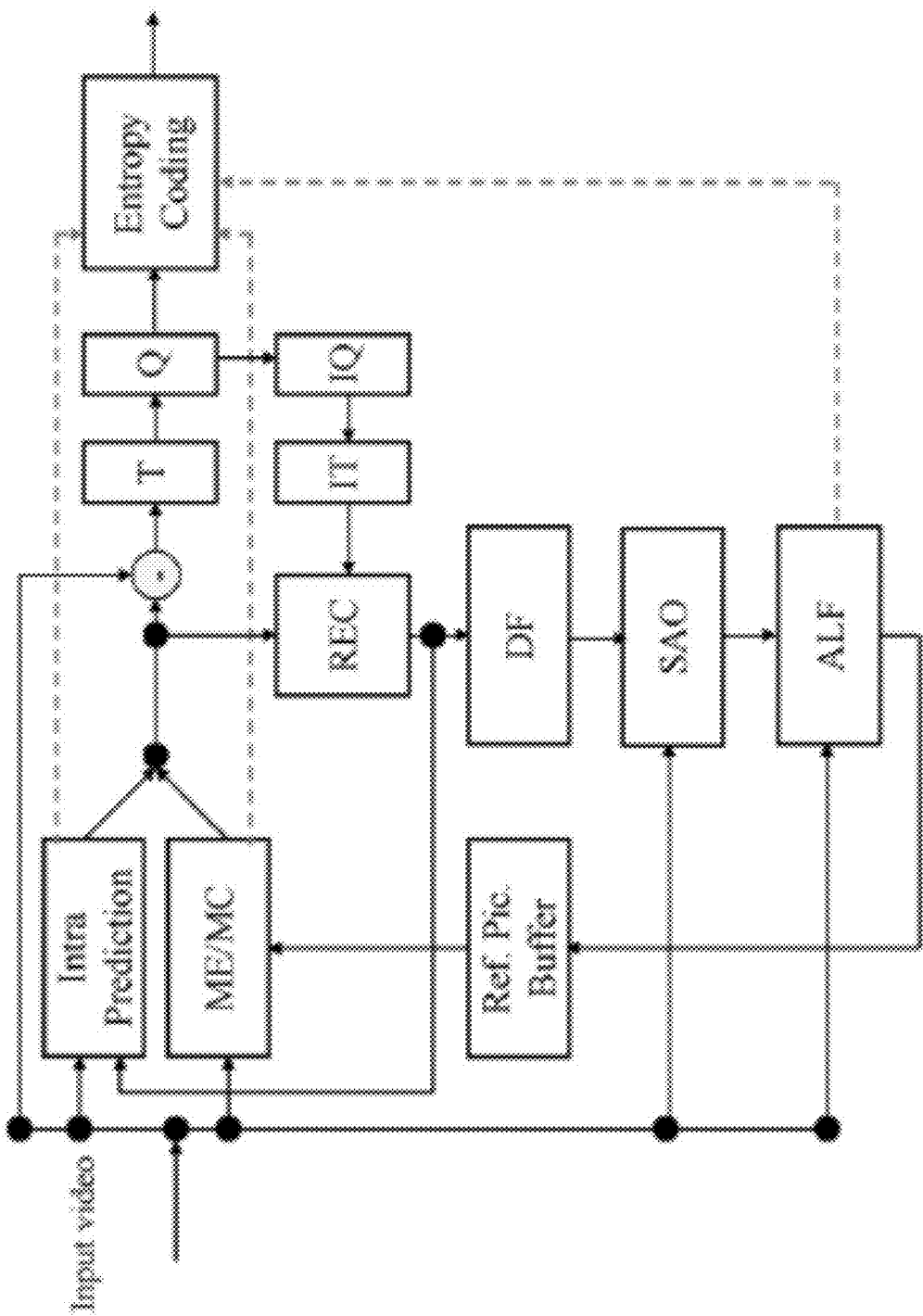
FIG. 1 shows an example of an encoder block diagram for video coding.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1 Examples of Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

1.1 The 4:4:4 Color Format

Each of the three Y'CbCr components have the same sample rate, thus there is no chroma subsampling. This scheme is sometimes used in high-end film scanners and cinematic post production.

1.2 The 4:2:2 Color Format

The two chroma components are sampled at half the sample rate of luma, e.g. the horizontal chroma resolution is halved. This reduces the bandwidth of an uncompressed video signal by one-third with little to no visual difference.

1.3 The 4:2:0 Color Format

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

2 Examples of the Coding Flow of a Typical Video Codec

FIG. 1 shows an example of encoder block diagram of VVC. As shown in FIG. 1, the flow of video encoding may start with an input video that undergoes intra prediction and/or motion estimation/motion compensation (ME/MC). These operations use a feedback from a reconstructed copy of previously coded portion of video. The outputs of intra prediction and/or ME/MC are differentially processed through a transform operation (T), followed by a quantization operation (Q), which is entropy coded into an output coded representation. In the feedback loop, the encoded representation (output of Q block) may go through an inverse quantization operation (IQ), followed by an inverse transform (IT) operation to generate reconstruction samples of the encoded video blocks.

The reconstructed samples may further be processed through various "in-loop" filtering operations to generate reference samples, or reference blocks, or reference pictures used for further encoding. The in-loop filtering process chain contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

At the decoder side, several of the encoding operations are performed in a reverse order to generate decoded and reconstructed video samples. For example, referring to FIG. 1, a decoder may parse the coded representation that is the output of the entropy coding and obtain encode units or blocks of video that are then passed through the inverse quantization (IQ) operation and inverse transformation (IT) operation to generate reconstruction samples of the video unit. The final decoded video unit may be generated by applying the in-loop filtering operations as described above with respect to the feedback loop of the video encoder.

3 Examples of a Geometry Transformation-Based Adaptive Loop Filter in JEM

In the JEM, a geometry transformation-based adaptive loop filter (GALF) with block-based filter adaption is applied. For the luma component, one among 25 filters is selected for each 2×2 block, based on the direction and activity of local gradients.

3.1 Examples of Filter Shape

Figures 2A, 2B, 2C:
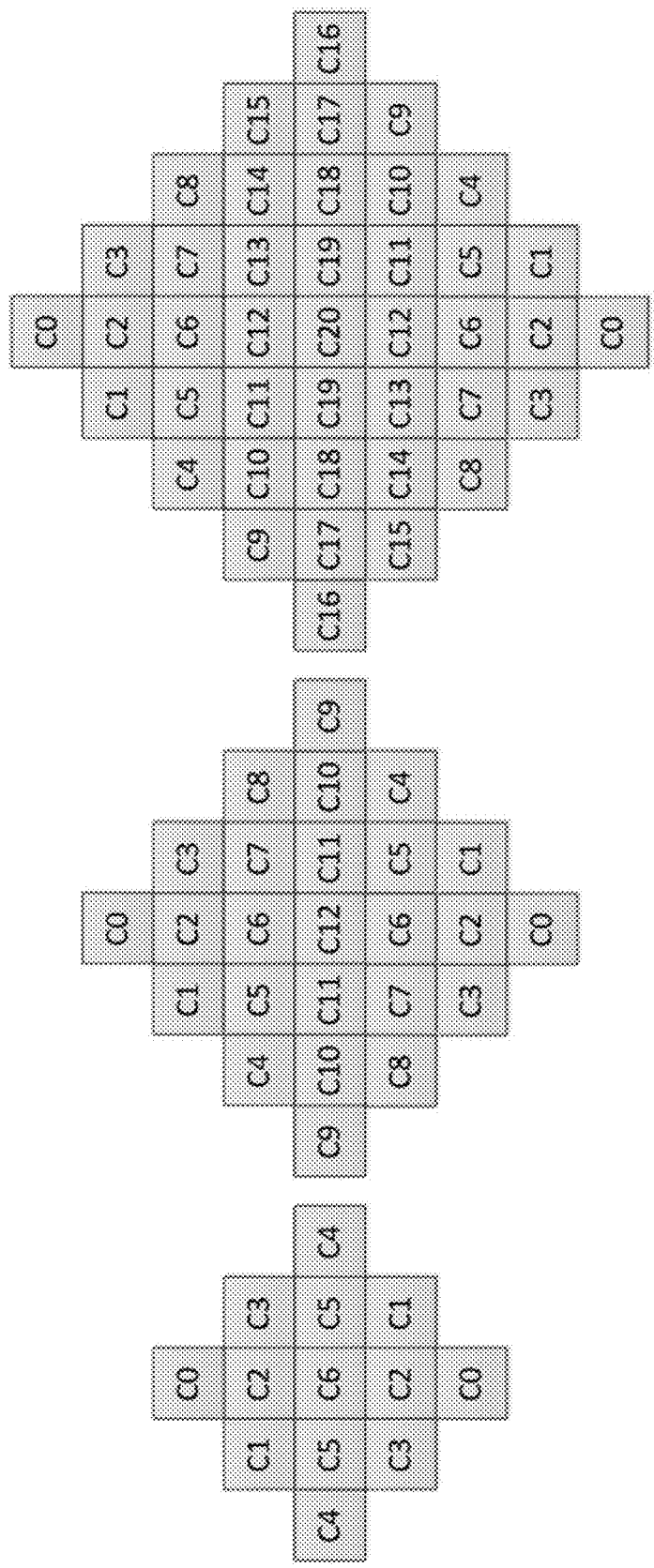
FIGS. 2A, 2B and 2C show examples of geometry transformation-based adaptive loop filter (GALF) filter shapes.

In the JEM, up to three diamond filter shapes (as shown in FIGS. 2A, 2B and 2C for the 5×5 diamond, 7×7 diamond and 9×9 diamond, respectively) can be selected for the luma component. An index is signalled at the picture level to indicate the filter shape used for the luma component. For chroma components in a picture, the 5×5 diamond shape is always used.

3.1.1 Block Classification

Each 2×2 block is categorized into one out of 25 classes. The classification index C is derived based on its directionality D and a quantized value of activity $\hat{A}$, as follows:

$$C = 5D + \hat{A}. \tag{1}$$

To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l}, V_{k,l} = |2R(k,l) - R(k,l-1) - R(k,l+1)|, \tag{2}$$

$$g_h = \sum_{k=i-2}^{i+3} \sum_{l=j-2}^{j+3} H_{k,l}, H_{k,l} = |2R(k,l) - R(k-1,l) - R(k+1,l)|, \tag{3}$$

$$g_{d1} = \sum_{k=i-2}^{i+3} \sum_{l=j-2}^{j+3} D1_{k,l}, \tag{4}$$

$$D1_{k,l} = |2R(k,l) - R(k-1,l-1) - R(k+1,l+1)|$$

$$g_{d2} = \sum_{k=i-2}^{i+3} \sum_{l=j-2}^{j+3} D2_{k,l}, \tag{5}$$

$$D2_{k,l} = |2R(k,l) - R(k-1,l+1) - R(k+1,l-1)|$$

Indices i and j refer to the coordinates of the upper left sample in the 2×2 block and R(i,j) indicates a reconstructed sample at coordinate (i,j).

Then D maximum and minimum values of the gradients of horizontal and vertical directions are set as:

$$g_{h,v}^{max} = \max(g_h, g_v), g_{h,v}^{min} = \min(g_h, g_v), \tag{6}$$

and the maximum and minimum values of the gradient of two diagonal directions are set as:

$$g_{d0,d1}^{max} = \max(g_{d0}, g_{d1}), g_{d0,d1}^{min} = \min(g_{d0}, g_{d1}), \tag{7}$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=i-2}^{i+3} \sum_{l=j-2}^{j+3} (V_{k,l} + H_{k,l}). \tag{8}$$

A is further quantized to the range of 0 to 4, inclusively, and the quantized value is denoted as $\hat{A}$. For both chroma components in a picture, no classification method is applied, i.e. a single set of ALF coefficients is applied for each chroma component.

3.1.2 Geometric Transformations of Filter Coefficients

Before filtering each 2×2 block, geometric transformations such as rotation or diagonal and vertical flipping are applied to the filter coefficients f(k,l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

$$\text{Diagonal: } f_D(k, l) = f(l, k), \quad (9)$$
$$\text{Vertical flip: } f_V(k, l) = f(k, K - l - 1),$$
$$\text{Rotation: } f_R(k, l) = f(K - l - 1, k),$$

Herein, K is the size of the filter and $0 \le k$, $l \le K-1$ are coefficients coordinates, such that location (0,0) is at the upper left corner and location (K−1, K−1) is at the lower right corner. The transformations are applied to the filter coefficients f(k,l) depending on gradient values calculated for that block. The relationship between the transformation and the four gradients of the four directions are summarized in Table 1.

TABLE 1

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

3.1.3 Signaling of Filter Parameters

In the JEM, GALF filter parameters are signaled for the first CTU, i.e., after the slice header and before the SAO parameters of the first CTU. Up to 25 sets of luma filter coefficients could be signaled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures, and bypass the GALF coefficients signaling. In this case, only an index to one of the reference pictures is signaled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (i.e., 6 in current JEM), a new set of filters overwrites the oldest set in decoding order, and that is, first-in-first-out (FIFO) rule is applied to update the candidate list. To avoid duplications, a set could only be added to the list when the corresponding picture doesn't use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and it only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signaling overhead. For intra frames, temporal prediction is not available, and a set of 16 fixed filters is assigned to each class. To indicate the usage of the fixed filter, a flag for each class is signaled and if required, the index of the chosen fixed filter. Even when the fixed filter is selected for a given class, the coefficients of the adaptive filter f(k,l) can still be sent for this class in which case the coefficients of the filter which will be applied to the reconstructed image are sum of both sets of coefficients.

The filtering process of luma component can controlled at CU level. A flag is signaled to indicate whether GALF is applied to the luma component of a CU. For chroma component, whether GALF is applied or not is indicated at picture level only.

3.1.4 Filtering Process

At decoder side, when GALF is enabled for a block, each sample R(i,j) within the block is filtered, resulting in sample value R'(i,j) as shown below, where L denotes filter length, $f_{m,n}$ represents filter coefficient, and f(k,l) denotes the decoded filter coefficients.

$$R'(i, j) = \sum_{k=-\frac{L}{2}}^{\frac{L}{2}} \sum_{l=-\frac{L}{2}}^{\frac{L}{2}} f(k, l) \times R(i+k, j+l) \quad (10)$$

3.1.5 Determination Process for Encoder Side Filter Parameters

Figure 3:
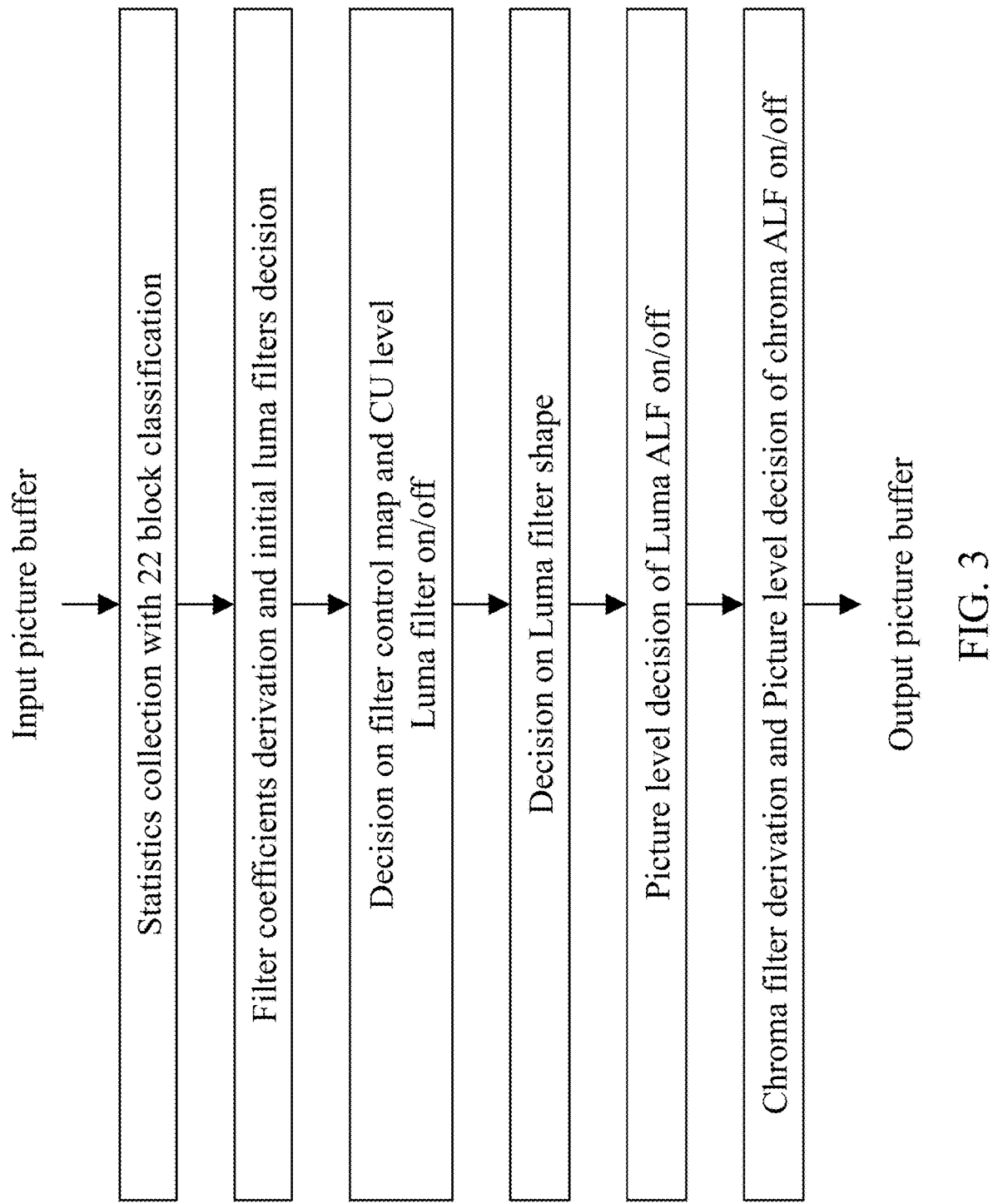
FIG. 3 shows an example of a flow graph for a GALF encoder decision.

Overall encoder decision process for GALF is illustrated in FIG. 3. For luma samples of each CU, the encoder makes a decision on whether or not the GALF is applied and the appropriate signalling flag is included in the slice header. For chroma samples, the decision to apply the filter is done based on the picture-level rather than CU-level. Furthermore, chroma GALF for a picture is checked only when luma GALF is enabled for the picture.

4 Examples of a Geometry Transformation-Based Adaptive Loop Filter in VVC

The current design of GALF in VVC has the following major changes compared to that in JEM:
1) The adaptive filter shape is removed. Only 7×7 filter shape is allowed for luma component and 5×5 filter shape is allowed for chroma component.
2) Temporal prediction of ALF parameters and prediction from fixed filters are both removed.
3) For each CTU, one bit flag is signaled whether ALF is enabled or disabled.
4) Calculation of class index is performed in 4×4 level instead of 2×2. In addition, as proposed in JVET-L0147, sub-sampled Laplacian calculation method for ALF classification is utilized. More specifically, there is no need to calculate the horizontal/vertical/45 diagonal/135 degree gradients for each sample within one block. Instead, 1:2 subsampling is utilized.

5 Examples of a Region-Based Adaptive Loop Filter in AVS2

ALF is the last stage of in-loop filtering. There are two stages in this process. The first stage is filter coefficient derivation. To train the filter coefficients, the encoder classifies reconstructed pixels of the luminance component into 16 regions, and one set of filter coefficients is trained for each category using wiener-hopf equations to minimize the mean squared error between the original frame and the reconstructed frame. To reduce the redundancy between these 16 sets of filter coefficients, the encoder will adaptively merge them based on the rate-distortion performance. At its maximum, 16 different filter sets can be assigned for the luminance component and only one for the chrominance components. The second stage is a filter decision, which includes both the frame level and LCU level. Firstly the encoder decides whether frame-level adaptive loop filtering is performed. If frame level ALF is on, then the encoder further decides whether the LCU level ALF is performed.

5.1 Filter Shape

Figure 5:
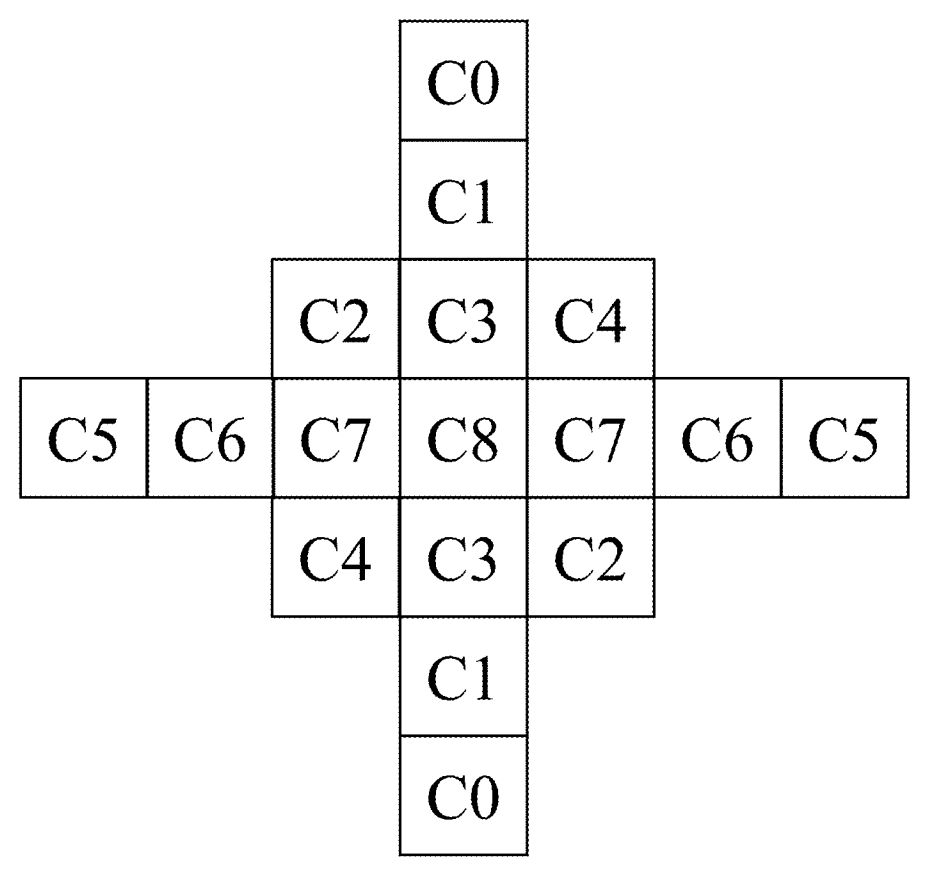

The filter shape adopted in AVS-2 is a 7×7 cross shape superposing a 3×3 square shape, just as illustrated in FIG. 5 for both luminance and chroma components. Each square in FIG. 5 corresponds to a sample. Therefore, a total of 17 samples are used to derive a filtered value for the sample of position C8. Considering overhead of transmitting the coefficients, a point-symmetrical filter is utilized with only nine coefficients left, {C0, C1, . . . , C8}, which reduces the number of filter coefficients to half as well as the number of multiplications in filtering. The point-symmetrical filter can also reduce half of the computation for one filtered sample, e.g., only 9 multiplications and 14 add operations for one filtered sample.

5.2 Region-Based Adaptive Merge

Figure 6:
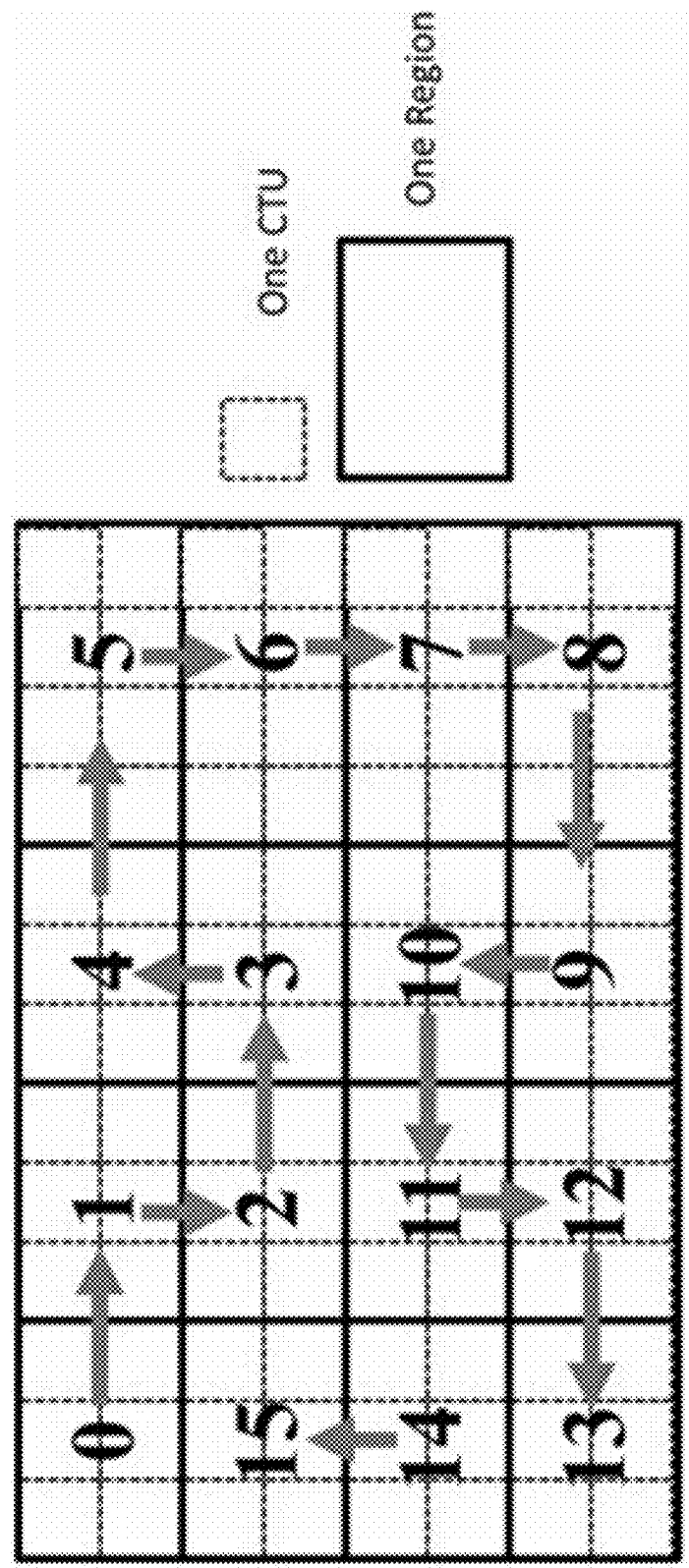
FIG. 6 shows an example of region division of a Wide Video Graphic Array (WVGA) sequence.

In order to adapt different coding errors, AVS-2 adopts region-based multiple adaptive loop filters for luminance component. The luminance component is divided into 16 roughly-equal-size basic regions where each basic region is aligned with largest coding unit (LCU) boundaries as shown in FIG. 6, and one Wiener filter is derived for each region. The more filters are used, the more distortions are reduced, but the bits used to encode these coefficients increase along with the number of filters. In order to achieve the best rate-distortion performance, these regions can be merged into fewer larger regions, which share the same filter coefficients. In order to simplify the merging process, each region is assigned with an index according to a modified Hilbert order based on the image prior correlations. Two regions with successive indices can be merged based on rate-distortion cost.

The mapping information between regions should be signaled to the decoder. In AVS-2, the number of basic regions is used to represent the merge results and the filter coefficients are compressed sequentially according to its region order. For example, when {0, 1}, {2, 3, 4}, {5, 6, 7, 8, 9} and the left basic regions merged into one region respectively, only three integers are coded to represent this merge map, i.e., 2, 3, 5.

5.3 Signaling of Side Information

Multiple switch flags are also used. The sequence switch flag, adaptive_loop_filter_enable, is used to control whether adaptive loop filter is applied for the whole sequence. The image switch flags, picture_alf_enble[i], control whether ALF is applied for the corresponding ith image component. Only if the picture_alf_enble[i] is enabled, the corresponding LCU-level flags and filter coefficients for that color component will be transmitted. The LCU level flags, lcu_alf_enable[k], control whether ALF is enabled for the corresponding kth LCU, and are interleaved into the slice data. The decision of different level regulated flags is all based on the rate-distortion cost. The high flexibility further makes the ALF improve the coding efficiency much more significantly.

In some embodiments, and for a luma component, there could be up to 16 sets of filter coefficients.

In some embodiments, and for each chroma component (Cb and Cr), one set of filter coefficients may be transmitted.

6 GALF in VTM-4

In VTM4.0, the filtering process of the Adaptive Loop Filter, is performed as follows:

$$O(x,y)=\Sigma_{(i,j)}w(i,j) \cdot I(x+i,y+j) \quad (11)$$

where samples I(x+i,y+j) are input samples, O(x,y) is the filtered output sample (i.e. filter result), and w(i,j) denotes the filter coefficients. In practice, in VTM4.0 it is implemented using integer arithmetic for fixed point precision computations:

$$O(x, y) = \left( \sum_{i=-\frac{L}{2}}^{\frac{L}{2}} \sum_{j=-\frac{L}{2}}^{\frac{L}{2}} w(i, j).I(x+i, y+j) + 64 \right) >> 7 \quad (12)$$

where L denotes the filter length, and where w(i,j) are the filter coefficients in fixed point precision.

7 Non-Linear Adaptive Loop Filtering (ALF)

7.1 Filtering Reformulation

Equation (11) can be reformulated, without coding efficiency impact, in the following expression:

$$O(x,y)=I(x,y)+\Sigma_{(i,j)\neq(0,0)}w(i,j) \cdot (I(x+i,y+j)-I(x,y)) \quad (13)$$

Herein, w(i,j) are the same filter coefficients as in equation (11) [excepted w(0, 0) which is equal to 1 in equation (13) while it is equal to $1-\Sigma_{(i,j)\neq(0,0)}w(i,j)$ in equation (11)].

7.2 Modified Filter

Using this above filter formula of (13), we can easily introduce non linearity to make ALF more efficient by using a simple clipping function to reduce the impact of neighbor sample values (I(x+i,y+j)) when they are too different with the current sample value (I(x,y)) being filtered.

In this proposal, the ALF filter is modified as follows:

$$O'(x,y)=I(x,y)+\Sigma_{(i,j)\neq(0,0)}w(i,j) \cdot K(I(x+i,y+j)-I(x,y),k(i,j)) \quad (14)$$

Herein, K(d,b)=min(b,max(−b,d)) is the clipping function, and k(i,j) are clipping parameters, which depends on the (i,j) filter coefficient. The encoder performs the optimization to find the best k(i,j)

In the JVET-N0242 implementation, the clipping parameters k(i,j) are specified for each ALF filter, one clipping value is signaled per filter coefficient. It means that up to 12 clipping values can be signalled in the bitstream per Luma filter and up to 6 clipping values for the Chroma filter.

In order to limit the signaling cost and the encoder complexity, we limit the evaluation of the clipping values to a small set of possible values. In the proposal, we only use 4 fixed values which are the same for INTER and INTRA tile groups.

Because the variance of the local differences is often higher for Luma than for Chroma, we use two different sets for the Luma and Chroma filters. We also include the maximum sample value (here 1024 for 10 bits bit-depth) in each set, so that clipping can be disabled if it is not necessary.

The sets of clipping values used in the JVET-N0242 tests are provided in the Table 2. The 4 values have been selected by roughly equally splitting, in the logarithmic domain, the full range of the sample values (coded on 10 bits) for Luma, and the range from 4 to 1024 for Chroma.

More precisely, the Luma table of clipping values have been obtained by the following formula:

$$AlfClip_L = \left\{ \text{round}\left(\left((M)^{\frac{1}{N}}\right)^{N-n+1}\right) \text{ for } n \in 1 \ldots N\right\}, \text{ with}$$
$$M = 2^{10} \text{ and } N = 4.$$

Similarly, the Chroma tables of clipping values is obtained according to the following formula:

$$AlfClip_C = \left\{ \text{round}\left(A.\left(\left(\frac{M}{A}\right)^{\frac{1}{N-1}}\right)^{N-n}\right) \text{ for } n \in 1 \ldots N\right\}, \text{ with}$$
$$M = 2^{10}, N = 4 \text{ and } A = 4.$$

TABLE 2

Authorized clipping values

| | INTRA/INTER tile group |
|---|---|
| LUMA | { 1024, 181, 32, 6 } |
| CHROMA | { 1024, 161, 25, 4 } |

The selected clipping values are coded in the "alf_data" syntax element by using a Golomb encoding scheme corresponding to the index of the clipping value in the above Table 2. This encoding scheme is the same as the encoding scheme for the filter index.

8 in-Loop Reshaping (ILR) in JVET-M0427

The in-loop reshaping (ILR) is also known as Luma Mapping with Chroma Scaling (LMCS).

The basic idea of in-loop reshaping (ILR) is to convert the original (in the first domain) signal (prediction/reconstruction signal) to a second domain (reshaped domain).

The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT [$Y_i$]. The other LUT is an inverse LUT, InvLUT, that maps altered code values $Y_r$ to $\hat{Y}_i$: $\hat{Y}_i$=InvLUT[$Y_r$]. ($\hat{Y}_i$ represents the reconstruction values of $Y_i$).

8.1 PWL Model

Conceptually, piece-wise linear (PWL) is implemented in the following way:

Let x1, x2 be two input pivot points, and y1,y2 be their corresponding output pivot points for one piece. The output value y for any input value x between x1 and x2 can be interpolated by the following equation:

$$y=((y2-y1)/(x2-x1))*(x-x1)+y1$$

In fixed point implementation, the equation can be rewritten as:

$$y=((m*x+2FP\_PREC-1)>>FP\_PREC)+c$$

Herein, m is scalar, c is an offset, and FP_PREC is a constant value to specify the precision.

Note that in CE-12 software, the PWL model is used to precompute the 1024-entry FwdLUT and InvLUT mapping tables; but the PWL model also allows implementations to calculate identical mapping values on-the-fly without precomputing the LUTs.

8.2 Test CE12-2 in the 4th VVC Meeting 8.2.1 Luma Reshaping

Test 2 of the in-loop luma reshaping (i.e., CE12-2 in the proposal) provides a lower complexity pipeline that also eliminates decoding latency for block-wise intra prediction in inter slice reconstruction. Intra prediction is performed in reshaped domain for both inter and intra slices.

Figure 7:
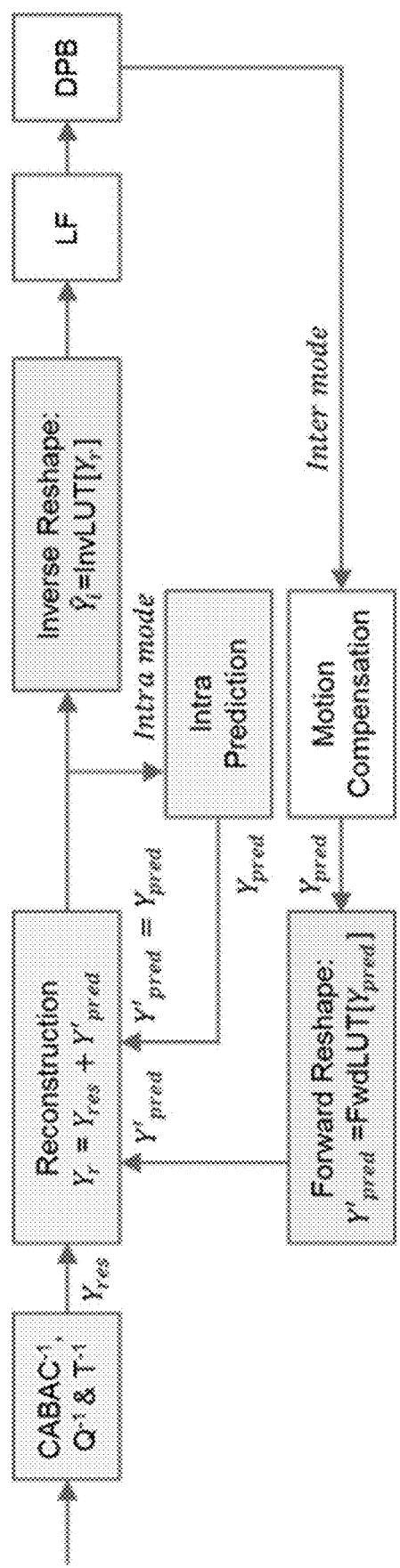
FIG. 7 shows an exemplary flowchart of decoding flow with reshaping.

Intra prediction is always performed in reshaped domain regardless of slice type. With such arrangement, intra prediction can start immediately after previous TU reconstruction is done. Such arrangement can also provide a unified process for intra mode instead of being slice dependent. FIG. 7 shows the block diagram of the CE12-2 decoding process based on mode.

CE12-2 also tests 16-piece piece-wise linear (PWL) models for luma and chroma residue scaling instead of the 32-piece PWL models of CE12-1.

Inter slice reconstruction with in-loop luma reshaper in CE12-2 (lighter shaded blocks indicate signal in reshaped domain: luma residue; intra luma predicted; and intra luma reconstructed)

8.2.2 Luma-Dependent Chroma Residue Scaling

Luma-dependent chroma residue scaling is a multiplicative process implemented with fixed-point integer operation. Chroma residue scaling compensates for luma signal interaction with the chroma signal. Chroma residue scaling is applied at the TU level. More specifically, the following applies:

For intra, the reconstructed luma is averaged.

For inter, the prediction luma is averaged.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values.

8.2.3 Signaling of ILR Side Information

The parameters are (currently) sent in the tile group header (similar to ALF). These reportedly take 40-100 bits. The following spec is based on version 9 of JVET-L1001. The added syntax is highlighted below in italicized font.

In 7.3.2.1 Sequence Parameter Set RBSP Syntax

| seq_parameter_set_rbsp( ) { | Descriptor |
|---|---|
| sps_seq_parameter_set_id | ue(v) |
| ... | |
| sps_triangle_enabled_flag | u(1) |
| sps_ladf_enabled_flag | u(1) |
| if ( sps_ladf_enabled_flag ) { | |
| sps_num_ladf_intervals_minus2 | u(2) |
| sps_ladf_lowest_interval_qp_offset | se(v) |
| for( i = 0; i < sps_num_ladf_intervals_minus2 + 1; i++) { | |
| sps_ladf_qp_offset[ i ] | se(v) |
| sps_ladf_delta_threshold_minus1[ i ] | ue(v) |
| } | |
| } | |
| *sps_reshaper_enabled_flag* | *u(1)* |
| rbsp_trailing_bits( ) | |
| } | |

In 7.3.3.1 General Tile Group Header Syntax

| tile_group_header( ) { | Descriptor |
|---|---|
| ... | |
|   if( num_tiles_in_tile_group_minus1 > 0 ) { | |
|     offset_len_minus1 | ue(v) |
|     for( i = 0; i < num_tiles_in_tile_group_minus1; i++ ) | |
|       entry_point_offset_minus1[ i ] | u(v) |
|   } | |
|   if( sps_reshaper_enabled_flag ) { | |
|     *title_group_reshaper_model_present_flag* | u(1) |
|     if ( tile_group_reshaper_model_present_flag ) | |
|       tile_group_reshaper_model ( ) | |
|     *title_group_reshaper_enable_flag* | u(1) |
|     if ( tile_group_reshaper_enable_flag && | |
| (!( qtbtt_dual_tree_intra_flag && tile_group_type = = I ) ) ) | |
|       *title_group_reshaper_chr oma_residual_scale_flag* | u(1) |
|   } | |
|   byte_alignment( ) | |
| } | |

Add a New Syntax Table Tile Group Reshaper Model:

| tile_group_reshaper_model ( ) { | Descriptor |
|---|---|
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   for ( i = reshaper_model_min_bin_idx; i <= reshaper_model_max_bin_idx; i++ ) { | |
|     reshape_model_bin_delta_abs_CW [ i ] | u(v) |
|     if( reshaper_model_bin_delta_abs_CW[ i ] ) > 0 ) | |
|       reshaper_model_bin_delta_sign_CW_flag[ i ] | u(1) |
|   } | |
| } | |

In General Sequence Parameter Set RBSP Semantics, Add the Following Semantics:
sps_reshaper_enabled_flag equal to 1 specifies that reshaper is used in the coded video sequence (CVS). sps_reshaper_enabled_flag equal to 0 specifies that reshaper is not used in the CVS.
In Tile Group Header Syntax, Add the Following Semantics
tile_group_reshaper_model_present_flag equal to 1 specifies tile_group_reshaper_model( ) is present in tile group header. tile_group_reshaper_model_present_flag equal to 0 specifies tile_group_reshaper_model( ) is not present in tile group header. When tile_group_reshaper_model_present_flag is not present, it is inferred to be equal to 0.
tile_group_reshaper_enabled_flag equal to 1 specifies that reshaper is enabled for the current tile group. tile_group_reshaper_enabled_flag equal to 0 specifies that reshaper is not enabled for the current tile group. When tile_group_reshaper_enable_flag is not present, it is inferred to be equal to 0.
tile_group_reshaper_chroma_residual_scale_flag equal to 1 specifies that chroma residual scaling is enabled for the current tile group. tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.
Add tile_group_reshaper_model( ) syntax
reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.
reshape_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx−reshape_model_delta_max_bin_idx.
reshaper_model_bin_delta_abs_cw_prec_minus1 plus 1 specifies the number of bits used for the representation of the syntax reshape_model_bin_delta_abs_CW[i].
reshape_model_bin_delta_abs_CW[i] specifies the absolute delta codeword value for the ith bin.
reshaper_model_bin_delta_sign_CW_flag[i] specifies the sign of reshape_model_bin_delta_abs_CW[i] as follows:
  If reshape_model_bin_delta_sign_CW_flag[i] is equal to 0, the corresponding variable RspDeltaCW[i] is a positive value.
  Otherwise (reshape_model_bin_delta_sign_CW_flag[i] is not equal to 0), the corresponding variable RspDeltaCW[i] is a negative value.
When reshape_model_bin_delta_sign_CW_flag[i] is not present, it is inferred to be equal to 0.
The variable RspDeltaCW [i]=(1 2*reshape_model_bin_delta_sign_CW
[i])*reshape_model_bin_delta_abs_CW [i];
The variable RspCW[i] is derived as following steps:
The variable OrgCW is set equal to $(1<<BitDepth_Y)/(MaxBinIdx+1)$.
  If
    reshaper_model_min_bin_idx<=i<=reshaper_model_max_bin_idx
  RspCW[i]=OrgCW+RspDeltaCW[i].
  Otherwise, RspCW[i]=0.
The value of RspCW [i] shall be in the range of 32 to 2*OrgCW−1 if the value of $BitDepth_Y$ is equal to 10.
The variables InputPivot[i] with i in the range of 0 to MaxBinIdx+1, inclusive are derived as follows
  InputPivot[i]=i*OrgCW
The variable ReshapePivot[i] with i in the range of 0 to MaxBinIdx+1, inclusive, the variable ScaleCoef[i] and InvScaleCoef[i] with i in the range of 0 to MaxBinIdx, inclusive, are derived as follows:

```
shiftY = 14
ReshapePivot[ 0 ] = 0;
for( i = 0; i <= MaxBinIdx ; i++) {
    ReshapePivot[ i + 1 ] = ReshapePivot[ 1 ] + RspCW[ 1 ]
    ScaleCoef[ 1 ] = ( RspCW[ 1 ] * (1 << shiftY) +
    (1 << (Log2(OrgCW) − 1))) >> (Log2(OrgCW))
    if ( RspCW[ i ] == 0 )
        InvScaleCoeff[ 1 ] = 0
    else
        InvScaleCoeff[ 1 ] = OrgCW * (1 << shiftY) / RspCW[ 1 ]
}
```

The variable ChromaScaleCoef[i] with i in the range of 0 to MaxBinIdx, inclusive, are derived as follows:
  ChromaResidualScaleLut[64]={16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, 1170, 1170, 1170, 1170, 1092, 1092, 1092, 1092, 1024, 1024, 1024, 1024};
  shiftC=11
    if(RspCW[ i ]==0)
      ChromaScaleCoef[i]=(1<<shiftC)
    Otherwise (RspCW[i]!=0), ChromaScaleCoef[i]= ChromaResidualScaleLut[RspCW[i]>>1]

8.2.4 Usage of ILR

At the encoder side, each picture (or tile group) is firstly converted to the reshaped domain. And all the coding process is performed in the reshaped domain. For intra prediction, the neighboring block is in the reshaped domain; for inter prediction, the reference blocks (generated from the original domain from decoded picture buffer) are firstly converted to the reshaped domain. Then the residual are generated and coded to the bitstream.

After the whole picture (or tile group) finishes encoding/decoding, samples in the reshaped domain are converted to the original domain, then deblocking filter and other filters are applied.

Forward reshaping to the prediction signal is disabled for the following cases:
- Current block is intra-coded
- Current block is coded as CPR (current picture referencing, aka intra block copy, IBC)
- Current block is coded as combined inter-intra mode (CIIP) and the forward reshaping is disabled for the intra prediction block

9 Drawbacks of Existing Implementations

The non-linear ALF (NLALF) design in JVET-N0242 has the following problems:

(1) It was designed for 4:2:0 color format. For 4:4:4 color format, luma and chroma components may be of similar importance. How to better apply NLALF is unknown.

(2) The clipping values are designed for the 10-bit case. How to define NLALF for other bit-depth hasn't been studied yet.

(3) The interaction of in-loop reshaping method and NLALF hasn't been studied.

10 Exemplary Methods for Improvements in Non-Linear Adaptive Loop Filtering

Embodiments of the presently disclosed technology overcome the drawbacks of existing implementations, thereby providing video coding with higher coding efficiencies. Non-linear adaptive loop filtering, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

1. It is proposed that the parameters (e.g., clipping parameters defined in Table 2) used in NLALF may depend on the coded information.
   a. It is proposed that the parameters (e.g., clipping parameters defined in Table 2) used in NLALF may depend on temporal layer index/low delay check flag/reference pictures.
2. Multiple sets of NLALF parameters may be defined or signaled.
   a. Alternatively, furthermore, when multiple sets of NLALF parameters are signaled, they may be signaled in a data unit such as Adaptation Parameter Set (APS)/tile group header/video data units.
   b. In one example, the NLALF parameters are signaled in a predictive way.
      i. For example, one set of NLALF parameters signaled in one data unit (such as APS or tile group, or slice) are predicted by another set of NLALF parameters signaled in the same data unit.
      ii. For example, one set of NLALF parameters signaled in one data unit (such as APS or tile group, or slice) are predicted by another set of NLALF parameters signaled in another data unit.
3. It is proposed that the parameters (e.g., clipping parameters defined in Table 2) used in NLALF may depend on bit-depth of reconstructed samples before applying NLALF.
   a. Alternatively, it is proposed that the parameters (e.g., clipping parameters defined in Table 2) used in NLALF may depend on input bit-depth of samples before being encoded/decoded.
   b. In one example, the parameters for one given bit-depth may be derived from that assigned for the other bit-depth.
      i. In one example, shifting operations according to bit-depth may be applied to derive the parameters for one given bit-depth.
4. It is proposed that the parameters (e.g., clipping parameters defined in Table 2) used in NLALF may depend on the color representation format.
   a. In one example, for the RGB case, the parameter with same index for the G color component and for the B/R color components.
5. It is proposed that the parameters (e.g., clipping parameters defined in Table 2) used in NLALF may depend on whether the in-loop reshaping (ILR) method is applied.
   a. In one example, the parameters may be different when ILR is enabled or disabled.
6. It is proposed to store the filter parameters (such as filter coefficients) and NLALF parameters (such as clipping parameters) together.
   a. In one example, both of them may be stored in APS.
   b. In one example, when one video data unit (e.g., CTU/region/tile group) uses filter coefficients associated with one APS, the associated NLALF parameters may be also utilized.
   c. Alternatively, for coding/decoding one video data unit (e.g., CTU/region/tile group), when prediction from filter coefficients associated with one APS is enabled, the associated NLALF parameters may be also utilized for predicting the NLALF parameters for the one video data unit from the same APS.
7. How to handle NLALF for chroma color components may depend on the color format.
   a. In one example, for one given color format (such as 4:4:4), two chroma components may use different NLALF parameters.
8. It is proposed that the clipping in ALF may be turned on or off at sequence level, picture level, slice level, tile group level, tile level, CTU level, CU level or block level.
   a. For example, whether to turn on the clipping in ALF may be signaled to decoder such as in SPS, PPS, slice header, tile group header, tile, CTU, CU, or block.

The examples described above may be incorporated in the context of the method described below, e.g., methods 810 to 840, which may be implemented at a video decoder or a video encoder.

Figure 8A:
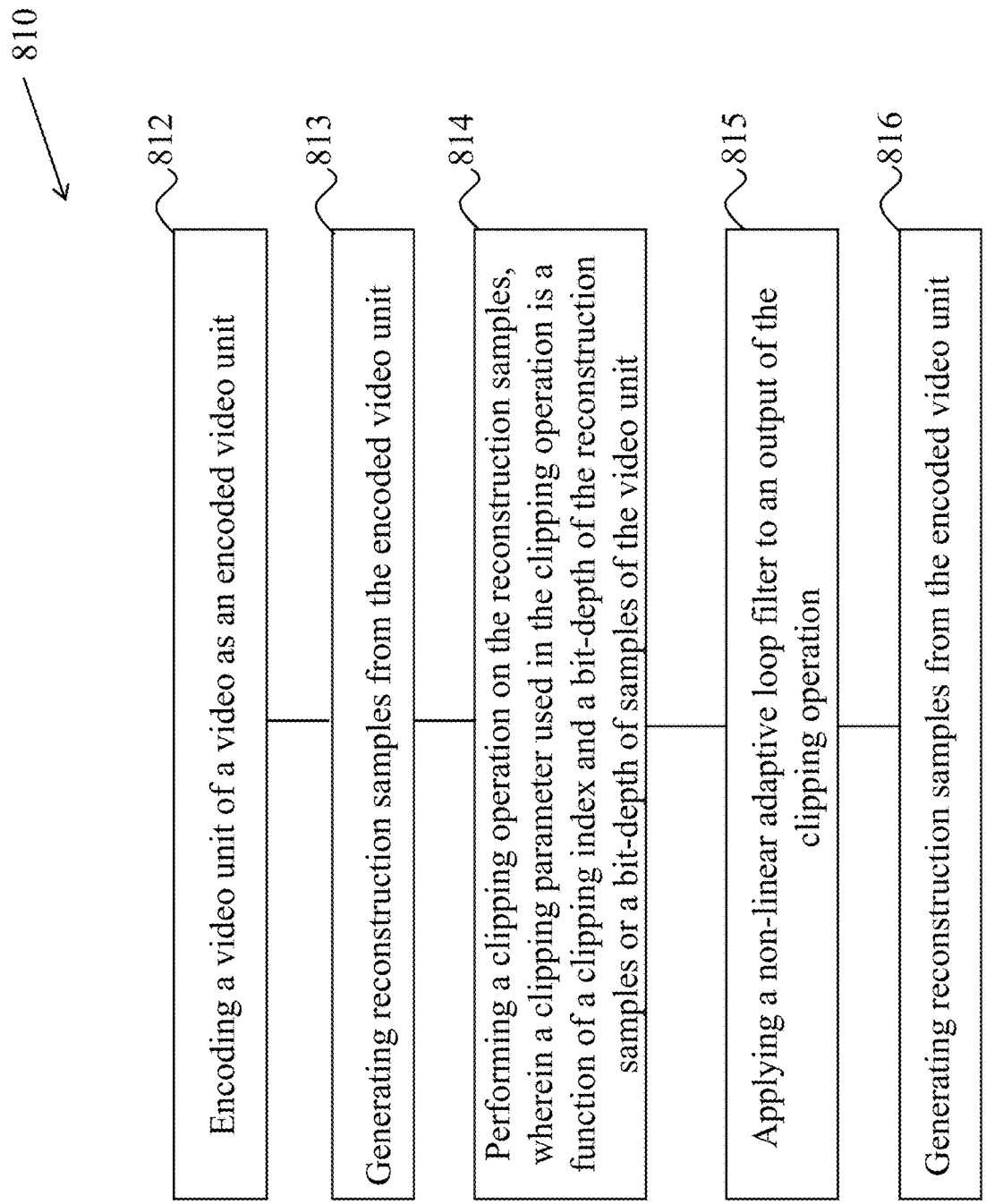
FIGS. 8A to 8C show flowcharts of example methods for video processing in accordance with some implementations of the disclosed technology.

FIG. 8A shows a flowchart of an exemplary method for video processing. The method 810 includes, at step 812, encoding a video unit of a video as an encoded video unit. The method 810 further includes, at step 813, generating reconstruction samples from the encoded video unit. The method 810 further includes, at step 814, performing a clipping operation on the reconstruction samples, wherein a clipping parameter used in the clipping operation is a function of a clipping index and a bit-depth of the reconstruction samples or a bit-depth of samples of the video unit. The method 810 further includes, at step 815, applying a non-linear adaptive loop filter to an output of the clipping operation. The method 810 further includes, at step 816, generating a coded representation of the video using the encoded video unit.

Figure 8B:
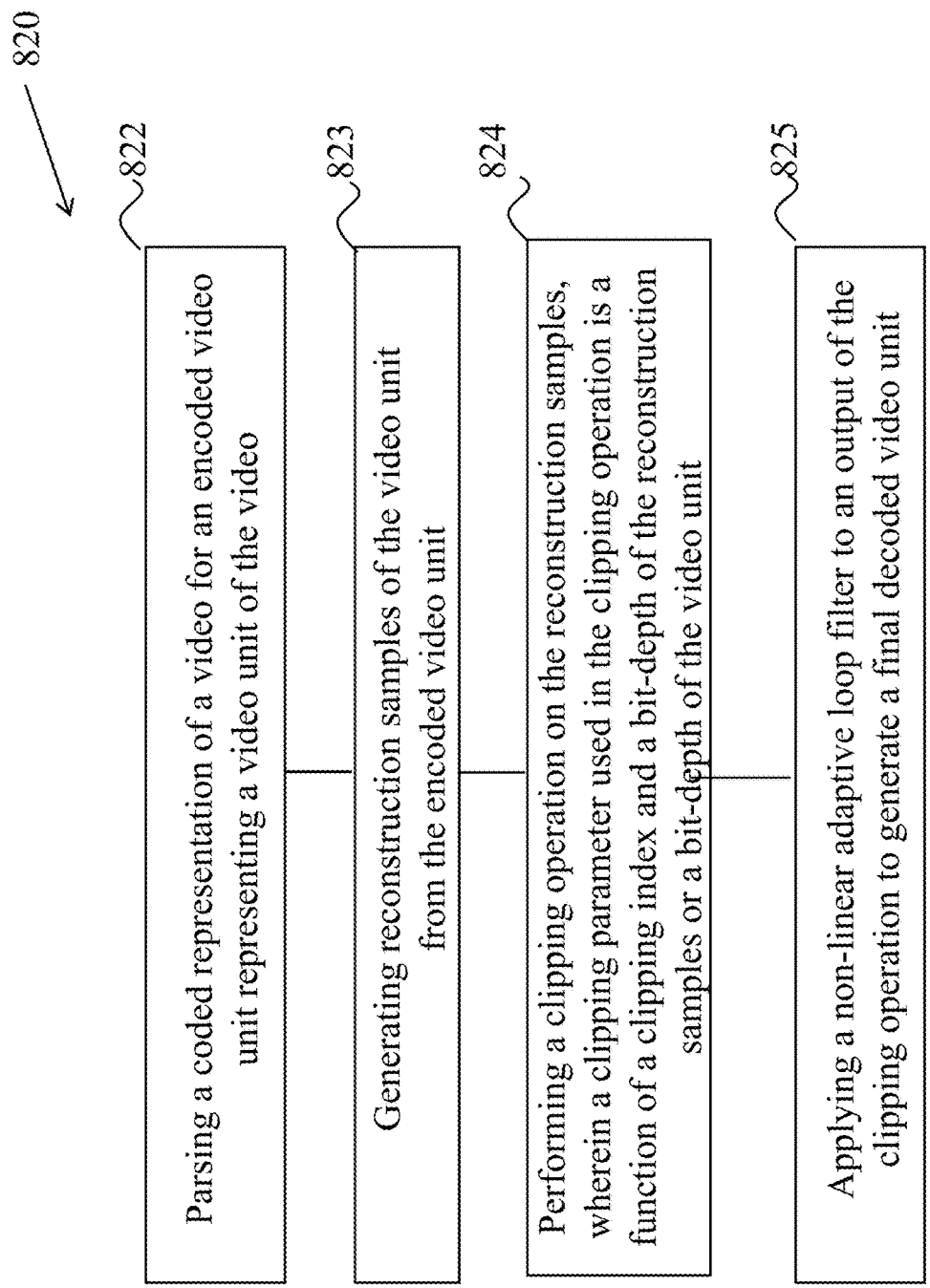

FIG. 8B shows a flowchart of an exemplary method for video processing. The method 820 includes, at step 822, parsing a coded representation of a video for an encoded video unit representing a video unit of the video. The method 820 further includes, at step 823, generating reconstruction samples of the video unit from the encoded video unit. The method 820 includes, at step 824, performing a clipping operation on the reconstruction samples, wherein a clipping parameter used in the clipping operation is a function of a clipping index and a bit-depth of the reconstruction samples or a bit-depth of the video unit. The method 820 further includes, at step 825, applying a non-linear adaptive loop filter to an output of the clipping operation to generate a final decoded video unit.

Figure 8C:
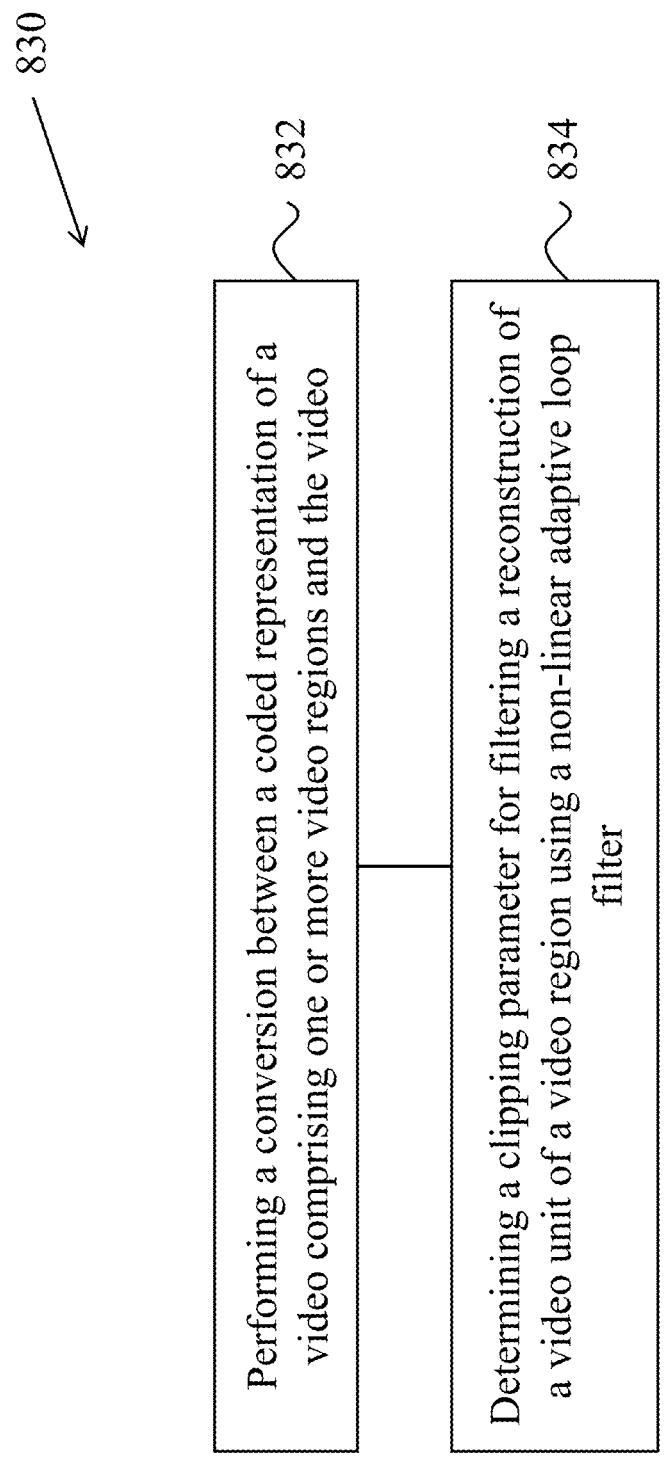

FIG. 8C shows a flowchart of an exemplary method for video processing. The method 830 includes, at step 832, performing a conversion between a coded representation of a video comprising one or more video regions and the video. The method 830 further includes, at step 834, determining a clipping parameter for filtering a reconstruction of a video unit of a video region using a non-linear adaptive loop filter. In some implementations, the determining is based on coded information of the video and/or the video region and/or the video unit. In some implementations, the clipping parameter is a function of a color representation format. In some implementations, the clipping parameter depends on whether an in-loop reshaping (ILR) is applied for reconstructing the video unit based on a representation of the video unit in a first domain and a second domain and/or scaling chroma residue of a chroma video unit.

Figure 9:
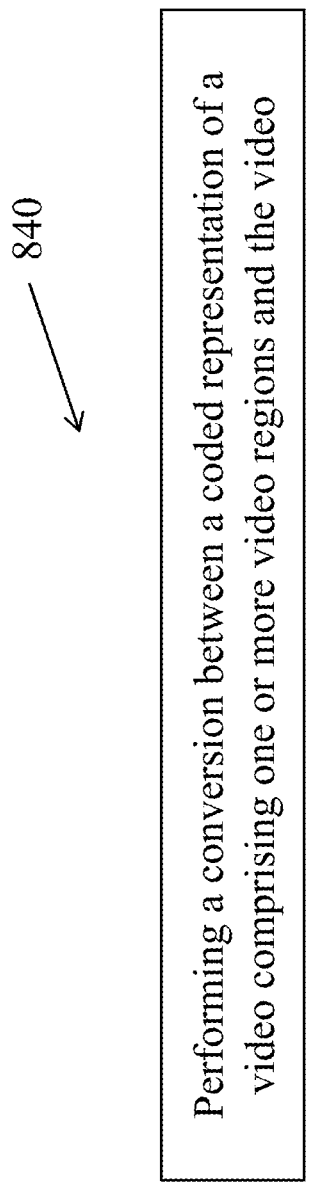
FIG. 9 shows a flowchart of an example method for video processing in accordance with some implementations of the disclosed technology.

FIG. 9 shows a flowchart of an exemplary method for video processing. The method 840 includes performing a conversion between a coded representation of a video comprising one or more video regions and the video. In some implementations, the coded representation includes first side information that provides a clipping parameter for filtering a reconstruction of a video unit of a video region using a non-linear adaptive loop filter and the first side information is signaled together with second side information indicative of filter coefficients used in the non-linear adaptive loop filter. In some implementations, the coded representation includes side information indicative of multiple sets of clipping parameters for filtering a reconstruction of a video unit of a video region using a non-linear adaptive loop filter. In some implementations, the coded representation includes side information that provides one or more clipping parameters for filtering a reconstruction of a chroma video unit of a video region using a non-linear adaptive loop filter, wherein the one or more clipping parameters depend on a color format. In some implementations, the coded representation includes side information that provides a clipping parameter for filtering a reconstruction of a video unit of a video region using an adaptive loop filter, wherein the performing includes generating a filtered video unit by applying a clipping operation to sample differences at a video region level.

11 Example Implementations of the Disclosed Technology

Figure 10A:
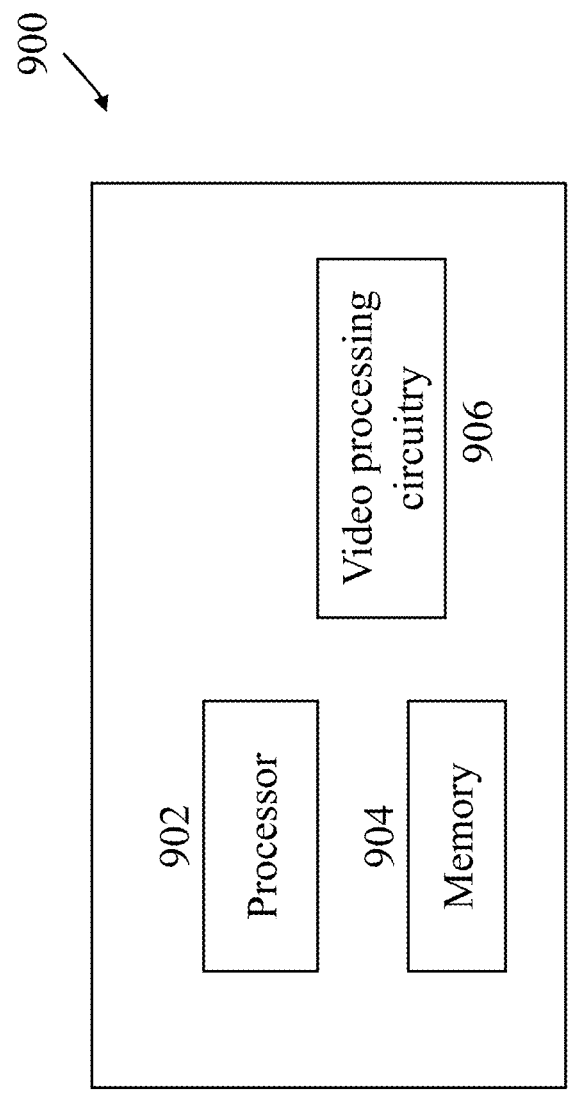
FIGS. 10A and 10B are block diagrams of examples of a hardware platform for implementing a video processing technique described in the present document.

FIG. 10A is a block diagram of a video processing apparatus 900. The apparatus 900 may be used to implement one or more of the methods described herein. The apparatus 900 may be embodied in a smartphone, tablet, computer, Internet of Things (IoT) receiver, and so on. The apparatus 900 may include one or more processors 902, one or more memories 904 and video processing hardware 906. The processor(s) 902 may be configured to implement one or more methods (including, but not limited to, method 800) described in the present document. The memory (memories) 904 may be used for storing data and code used for implementing the methods and techniques described herein. The video processing hardware 906 may be used to implement, in hardware circuitry, some techniques described in the present document.

Figure 10B:
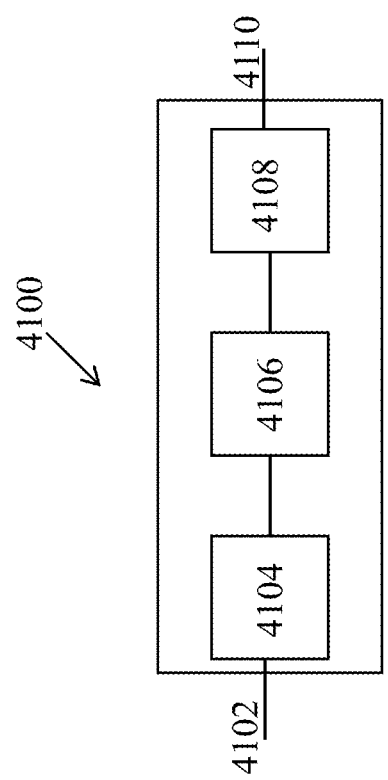

FIG. 10B is another example of a block diagram of a video processing system in which disclosed techniques may be implemented. FIG. 10B is a block diagram showing an example video processing system 4100 in which various techniques disclosed herein may be implemented. Various implementations may include some or all of the components of the system 4100. The system 4100 may include input 4102 for receiving video content. The video content may be received in a raw or uncompressed format, e.g., 8 or 10 bit multi-component pixel values, or may be in a compressed or encoded format. The input 4102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4100 may include a coding component 4104 that may implement the various coding or encoding methods described in the present document. The coding component 4104 may reduce the average bitrate of video from the input 4102 to the output of the coding component 4104 to produce a coded representation of the video. The coding techniques are therefore sometimes called video compression or video transcoding techniques. The output of the coding component 4104 may be either stored, or transmitted via a communication connected, as represented by the component 4106. The stored or communicated bitstream (or coded) representation of the video received at the input 4102 may be used by the component 4108 for generating pixel values or displayable video that is sent to a display interface 4110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

In some embodiments, the video coding methods may be implemented using an apparatus that is implemented on a hardware platform as described with respect to FIG. 10A or 10B.

Various techniques and embodiments may be described using the following clause-based format.

The first set of clauses describe certain features and aspects of the disclosed techniques listed in the previous section.

1. A method for video processing, comprising: determining, based on coded information of a current video block, a set of parameters for the current video block; and reconstructing, based on performing a non-linear filtering operation using the set of parameters, the current video block from a corresponding bitstream representation.

2. The method of clause 1, wherein the non-linear filtering operation comprises a non-linear adaptive loop filtering.

3. The method of clause 1 or 2, wherein the set of parameters comprises at least one clipping value for a luma component or a chroma component of the current video block.

4. The method of clause 3, wherein the non-linear filtering operation is based on a color format of the chroma component.

5. The method of any of clauses 1 to 3, wherein the coded information comprises a temporal layer index, a low delay check flag or one or more reference pictures.

6. The method of any of clauses 1 to 3, wherein the coded information comprises a bit-depth of reconstructed samples prior to the non-linear filtering operation.

7. The method of any of clauses 1 to 3, wherein the coded information comprises a color representation format.

8. The method of any of clauses 1 to 3, wherein the coded information comprises an indication of applying an in-loop reshaping (ILR) method.

9. The method of any of clauses 1 to 3, wherein the corresponding bitstream representation comprises multiple sets of parameters that include the set of parameters, and wherein the multiple sets of parameters in signaled in an Adaptation Parameter Set (APS), a tile group header or one or more video data units.

10. The method of any of clauses 1 to 3, wherein the corresponding bitstream representation comprises an Adaptation Parameter Set (APS) that includes the set of parameters and one or more filter coefficients associated with the non-linear filtering operation.

11. The method of clause 1 or 2, wherein the set of parameters comprises one or more clipping values, and wherein the non-linear filtering operation is performed at a sequence level, a picture level, a slice level, a tile group level, a tile level, a coding tree unit (CTU) level, a coding unit (CU) level or a block level.

12. An apparatus in a video system comprising a processor and a non-transitory memory with instructions thereon, wherein the instructions upon execution by the processor, cause the processor to implement the method in any one of clauses 1 to 11.

13. A computer program product stored on a non-transitory computer readable media, the computer program product including program code for carrying out the method in any one of clauses 1 to 11.

The second set of clauses describe certain features and aspects of the disclosed techniques listed in the previous section, including, for example, Example Implementations 1 and 3-5.

1. A video processing method, comprising: encoding a video unit of a video as an encoded video unit; generating reconstruction samples from the encoded video unit; performing a clipping operation on the reconstruction samples, wherein a clipping parameter used in the clipping operation is a function of a clipping index and a bit-depth of the reconstruction samples or a bit-depth of samples of the video unit; applying a non-linear adaptive loop filter to an output of the clipping operation; and generating a coded representation of the video using the encoded video unit.

2. The method of clause 1, wherein the clipping index is signaled in the coded representation.

3. A video processing method, comprising: parsing a coded representation of a video for an encoded video unit representing a video unit of the video; generating reconstruction samples of the video unit from the encoded video unit; performing a clipping operation on the reconstruction samples, wherein a clipping parameter used in the clipping operation is a function of a clipping index and a bit-depth of the reconstruction samples or a bit-depth of the video unit; and applying a non-linear adaptive loop filter to an output of the clipping operation to generate a final decoded video unit.

4. The method of clause 3, wherein the clipping index is determined at least based on a field in the coded representation.

5. The method of clause 3, wherein the clipping index is determined using a pre-defined rule.

6. The method of clause 1 or 3, wherein the function of the clipping index and the bit-depth of the reconstruction samples or the bit-depth of the video unit is such that the function returns different values for a given value of the clipping index based on the bit-depth of the reconstruction samples or the bit-depth of the video unit.

7. The method of clause 1 or 3, wherein a mapping between the clipping index and the clipping parameter depends on the bit-depth of the reconstruction sample or the bit-depth of the video unit.

8. The method of clause 1 or 3, wherein a first clipping value corresponding to a first clipping index for a given bit-depth is derived based on a second clipping value corresponding to a second clipping index for another bit-depth.

9. The method of clause 8, wherein a shifting operation using another bit-depth is applied to derive the clipping parameter for the given bit-depth.

10. The method of any clauses 1 to 9, wherein the coded representation includes the clipping parameter that control an upper or lower bound of two sample differences used in the non-linear adaptive loop filter.

11. A video processing method, comprising: performing a conversion between a coded representation of a video comprising one or more video regions and the video; and determining a clipping parameter for filtering a reconstruction of a video unit of a video region using a non-linear adaptive loop filter, and wherein the determining is based on coded information of the video and/or the video region and/or the video unit.

12. The method of clause 11, wherein the coded information comprises a temporal layer index.

13. The method of clause 11, wherein the coded information comprises a low delay check flag.

14. The method of clause 11, wherein the coded information comprises one or more reference pictures.

15. The method of any of clauses 11 to 14, wherein the video region comprises a video picture.

16. The method of any of clauses 11 to 14, wherein the video unit comprises a coding unit.

17. The method of any of clauses 11 to 16, wherein the clipping parameter controls an upper or lower bound of two sample differences used in the non-linear adaptive loop filter.

18. A video processing method, comprising: performing a conversion between a coded representation of a video comprising one or more video regions and the video; and determining a clipping parameter for filtering a reconstruction of a video unit of a video region using a non-linear adaptive loop filter, and wherein the clipping parameter is a function of a color representation format.

19. The method of clause 18, wherein, for a RGB color format, the clipping parameter has a same index for a green color component and for a blue or red color component.

20. A video processing method, comprising: performing a conversion between a coded representation of a video comprising one or more video regions and the video; and determining a clipping parameter for filtering a reconstruction of a video unit of a video region using a non-linear adaptive loop filter, and wherein the clipping parameter depends on whether an in-loop reshaping (ILR) is applied for reconstructing the video unit based on a representation of the video unit in a first domain and a second domain and/or scaling chroma residue of a chroma video unit.

21. The method of any of clauses 1 to 21, wherein the clipping parameter corresponds to a clipping value for a luma component or a chroma component of the video unit.

22. The method of any of clauses 1 to 21, wherein the method further includes, during the conversion, generating a filtered video unit by applying the non-linear adaptive loop filter to the reconstruction of the video unit, and using the filtered video unit for determining a prediction of another video unit of the video.

23. The method of any of clauses 1 to 22, wherein the performing of the conversion includes generating the coded representation from the video.

24. The method of any of clauses 1 to 22, wherein the performing of the conversion includes generating the video from the coded representation.

25. An apparatus in a video system comprising a processor and a non-transitory memory with instructions thereon, wherein the instructions upon execution by the processor, cause the processor to implement the method in any one of clauses 1 to 24.

26. A computer program product stored on a non-transitory computer readable media, the computer program product including program code for carrying out the method in any one of clauses 1 to 24.

The third set of clauses describe certain features and aspects of the disclosed techniques listed in the previous section, including, for example, Example Implementations 2 and 6-8.

1. A video processing method, comprising: performing a conversion between a coded representation of a video comprising one or more video regions and the video, wherein the coded representation includes first side information that provides a clipping parameter for filtering a reconstruction of a video unit of a video region using a non-linear adaptive loop filter; wherein the first side information is signaled together with second side information indicative of filter coefficients used in the non-linear adaptive loop filter.

2. The method of clause 1, wherein the first side information and the second side information are signaled in a same adaptation parameter set.

3. The method of clause 1, wherein in a case that at least some of the filter coefficients associated with an adaptation parameter set is used by a video data unit, the clipping parameter associated with the adaptation parameter set is also used by the video data unit.

4. The method of clause 1, wherein in a case that a prediction from at least some of the filter coefficients associated with an adaptation parameter set is enabled for the conversion of a video data unit, the parameter associated with the adaptation parameter set is used for predicting another parameter for another video data unit from the adaptation parameter set.

5. The method of clause 3 or 4, wherein the video data unit is a coding tree unit, a video region, or a tile group.

6. The method of any of clauses 1 to 5, wherein the parameter corresponds to a clipping value for a luma component or a chroma component of the video unit.

7. A video processing method, comprising: performing a conversion between a coded representation of a video comprising one or more video regions and the video, wherein the coded representation includes side information indicative of multiple sets of clipping parameters for filtering a reconstruction of a video unit of a video region using a non-linear adaptive loop filter.

8. The method of clause 7, wherein the side information includes the multiple sets of clipping parameters.

9. The method of clause 7, wherein the multiple sets of clipping parameters are known to an encoder and a decoder and the side information includes an index to one or more of the multiple sets of clipping parameters.

10. The method of clause 7, wherein the multiple sets of the clipping parameters are included in a video data unit or a header of the video unit.

11. The method of clause 10, wherein the video data unit includes an adaptation parameter set, a tile group or a slice.

12. The method of clause 8, wherein one set of the multiple sets of the clipping parameters signaled in a data unit is predicted by another set of the clipping parameters signaled in the data unit.

13. The method of clause 7, wherein one set of the multiple sets of the clipping parameters signaled in a data unit is predicted by another set of the clipping parameters signaled in another data unit.

14. A video processing method, comprising: performing a conversion between a coded representation of a video comprising one or more video regions and the video; wherein the coded representation includes side information that provides one or more clipping parameters for filtering a reconstruction of a chroma video unit of a video region using a non-linear adaptive loop filter, wherein the one or more clipping parameters depend on a color format.

15. The method of clause 14, wherein, for a certain color format, two chroma components use different clipping parameters.

16. The method of clause 15, wherein the certain color format is 4:4:4.

17. The method of any of clauses 1 to 16, wherein the method further includes, during the conversion, generating a filtered video unit by applying the non-linear adaptive loop filter to the reconstruction of the video unit, and using the filtered video unit for determining a prediction of another video unit of the video.

18. A video processing method, comprising: performing a conversion between a coded representation of a video comprising one or more video regions and the video, wherein the coded representation includes side information that provides a clipping parameter for filtering a reconstruction of a video unit of a video region using an adaptive loop filter, wherein the performing includes generating a filtered video unit by applying a clipping operation to sample differences at a video region level.

19. The method of clause 18, wherein the video region level is a sequence level, a picture level, a slice level, a tile group level, a tile level, a coding tree unit level, a coding unit level, or a block level.

20. The method of clause 18, wherein an indication to enable the clipping operation is signaled in a sequence parameter set (SPS), a picture parameter set (PPS), a slice header, a tile group header, a tile, a coding tree unit, a coding unit, or a block.

21. The method of any of clauses 1 to 20, wherein the video region is a video picture.

22. The method of any of clauses 1 to 20, wherein the video unit is a coding unit or a transform unit or a slice or a coding tree or a coding tree row.

23. The method of any of clauses 1 to 22, wherein the performing of the conversion includes generating the coded representation from the current block.

24. The method of any of clauses 1 to 22, wherein the performing of the conversion includes generating the current block from the coded representation.

25. An apparatus in a video system comprising a processor and a non-transitory memory with instructions thereon, wherein the instructions upon execution by the processor, cause the processor to implement the method in any one of clauses 1 to 24.

26. A computer program product stored on a non-transitory computer readable media, the computer program product including program code for carrying out the method in any one of clauses 1 to 24.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, that a non-linear adaptive loop filtering operation is applied for a current video region of a video, wherein the current video region is a coding tree block;
   deriving at least one first filtering index for the current video region and deriving one or more first filtering parameters based on the at least one first filtering index;
   deriving one or more first clipping parameters from a clipping parameter set based on the at least one first filtering index;
   performing a clipping operation which is part of the non-linear adaptive loop filtering operation based on the one or more first clipping parameters, wherein the one or more first clipping parameters are used to clip the differences between reference sample values of a current sample value of the current video region and the current sample value before applying the one or more first filtering parameters; and
   performing a conversion between the current video region and a bitstream of the video based on the non-linear adaptive loop filtering operation;
   wherein the clipping parameter set is constructed based on a bit-depth and a clipping index based on a predefined table, wherein in the predefined table, a value of one clipping parameter corresponding to a first clipping index for a given bit-depth is derived based on a value of another clipping parameter corresponding to the first clipping index for another bit-depth.

2. The method of claim 1, wherein a shifting operation is used for deriving clipping parameter values of the clipping parameter set.

3. The method of claim 1, wherein the clipping index is associated with a field in the bitstream.

4. The method of claim 1, wherein the clipping index is determined using a pre-defined rule.

5. The method of claim 1, wherein for the clipping parameter set, different clipping parameter values are used for different bit-depth under a given value of the clipping index.

6. The method of claim 1, wherein in the predefined table, the value of the one clipping parameter is derived based on applying a shifting operation on the value of the another clipping parameter.

7. The method of claim 1, wherein the at least one first filtering index is derived based on multiple sample differences in different directions.

8. The method of claim 7, wherein the current video region is split into multiple M*M video region, and the multiple sample differences in different directions are derived for every M*M video sub-region, and wherein M is equal to 2 or 4.

9. The method of claim 8, wherein the multiple sample differences in different directions are derived based on 1:N subsampling rate, wherein N is great than 1.

10. The method of claim 1, wherein the one or more first filtering parameters and the one or more first clipping parameters are derived based on a same adaptation parameter set identification.

11. The method of claim 1, wherein the conversion includes encoding the current video region into the bitstream.

12. The method of claim 1, wherein the conversion includes decoding the current video region from the bitstream.

13. An apparatus for processing video data comprising a processor and a non-transitory memory with instructions thereon, wherein the instructions upon execution by the processor, cause the processor to:
   determine, that a non-linear adaptive loop filtering operation is applied for a current video region of a video, wherein the current video region is a coding tree block;
   derive at least one first filtering index for the current video region and derive one or more first filtering parameters based on the at least one first filtering index;
   derive one or more first clipping parameters from a clipping parameter set based on the at least one first filtering index,
   perform a clipping operation which is part of the non-linear adaptive loop filtering operation based on the one or more first clipping parameters, wherein the one or more first clipping parameters are used to clip the differences between reference sample values of a current sample value of the current video region and the current sample value before applying the one or more first filtering parameters; and
   perform a conversion between the current video region and a bitstream of the video based on the non-linear adaptive loop filtering operation;

wherein the clipping parameter set is constructed based on a bit-depth and a clipping index based on a predefined table, wherein in the predefined table, a value of one clipping parameter corresponding to a first clipping index for a given bit-depth is derived based on a value of another clipping parameter corresponding to the first clipping index for another bit-depth.

14. The apparatus of claim 13, wherein a shifting operation is used for deriving clipping parameter values of the clipping parameter set.

15. The apparatus of claim 13, wherein for the clipping parameter set, different clipping parameter values are used for different bit-depth under a given value of the clipping index.

16. A non-transitory computer-readable storage medium storing instructions that cause a processor to:
   determine, that a non-linear adaptive loop filtering operation is applied for a current video region of a video, wherein the current video region is a coding tree block;
   derive at least one first filtering index for the current video region and derive one or more first filtering parameters based on the at least one first filtering index;
   derive one or more first clipping parameters from a clipping parameter set based on the at least one first filtering index,
   perform a clipping operation which is part of the non-linear adaptive loop filtering operation based on the one or more first clipping parameters, wherein the one or more first clipping parameters are used to clip the differences between reference sample values of a current sample value of the current video region and the current sample value before applying the one or more first filtering parameters; and
   perform a conversion between the current video region and a bitstream of the video based on the non-linear adaptive loop filtering operation;
   wherein the clipping parameter set is constructed based on a bit-depth and a clipping index based on a predefined table, wherein in the predefined table, a value of one clipping parameter corresponding to a first clipping index for a given bit-depth is derived based on a value of another clipping parameter corresponding to the first clipping index for another bit-depth.

17. A non-transitory computer-readable recording medium storing a bitstream of a video which is generated by a method performed by a video processing apparatus, wherein the method comprises:
   determining, that a non-linear adaptive loop filtering operation is applied for a current video region of a video, wherein the current video region is a coding tree block;
   deriving at least one first filtering index for the current video region and deriving one or more first filtering parameters based on the at least one first filtering index;
   deriving one or more first clipping parameters from a clipping parameter set based on the at least one first filtering index,
   performing a clipping operation which is part of the non-linear adaptive loop filtering operation based on the one or more first clipping parameters, wherein the one or more first clipping parameters are used to clip the differences between reference sample values of a current sample value of the current video region and the current sample value before applying the one or more first filtering parameters; and
   generating a bitstream of the video based on the clipping operation;
   wherein the clipping parameter set is constructed based on a bit-depth and a clipping index based on a predefined table, wherein in the predefined table, a value of one clipping parameter corresponding to a first clipping index for a given bit-depth is derived based on a value of another clipping parameter corresponding to the first clipping index for another bit-depth.

18. The non-transitory computer-readable storage medium of claim 16, wherein the instructions are configured to further cause a processor to perform a shifting operation to derive clipping parameter values of the clipping parameter set.

19. The non-transitory computer-readable recording medium of claim 17, wherein the instructions are configured to further cause a processor to perform a shifting operation to derive clipping parameter values of the clipping parameter set.

* * * * *